(12) United States Patent
Morino et al.

(10) Patent No.: US 7,618,161 B2
(45) Date of Patent: Nov. 17, 2009

(54) FRESNEL LENS AND LIGHTING APPARATUS PROVIDED WITH THE FRESNEL LENS

(75) Inventors: Takeshi Morino, Tokyo (JP); Yoshinori Honguh, Yokohama (JP); Masataka Shiratsuchi, Kawasaki (JP); Naoto Tokuhara, Kamifukuoka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 18 days.

(21) Appl. No.: 11/224,953

(22) Filed: Sep. 14, 2005

(65) Prior Publication Data
US 2006/0056185 A1 Mar. 16, 2006

(30) Foreign Application Priority Data
Sep. 16, 2004 (JP) ............................. 2004-269226

(51) Int. Cl.
*F21V 5/04* (2006.01)
(52) U.S. Cl. .................. 362/335; 362/244; 362/328; 362/332; 362/337; 362/340; 359/742; 359/743
(58) Field of Classification Search ................ 362/328, 362/332, 335, 337, 340, 244, 311.01, 311.02, 362/311.06, 311.09, 311.12, 326, 336; 359/742, 359/743
See application file for complete search history.

(56) References Cited

U.S. PATENT DOCUMENTS

| 1,955,599 | A | * | 4/1934 | Lamblin-Parent | ........... | 362/215 |
| 5,742,438 | A | * | 4/1998 | Conner et al. | ............... | 359/743 |
| 5,995,303 | A |   | 11/1999 | Honguh et al. | | |
| 6,899,451 | B2 | * | 5/2005 | Kittelmann et al. | ......... | 362/538 |
| 2002/0196639 | A1 | * | 12/2002 | Weidel | ....................... | 362/521 |
| 2003/0063466 | A1 |   | 4/2003 | Kittelmann et al. | | |
| 2004/0164927 | A1 | * | 8/2004 | Suyama et al. | ................ | 345/32 |

FOREIGN PATENT DOCUMENTS

JP          8-62728          3/1996

* cited by examiner

*Primary Examiner*—Sharon E Payne
*Assistant Examiner*—Mary Zettl
(74) *Attorney, Agent, or Firm*—Oblon, Spivak, McClelland, Maier & Neustadt, L.L.P.

(57) ABSTRACT

In a Fresnel lens which is made of a lens material whose refraction index is n, and focuses light beam from a light source at a specified radiation view angle $\phi$, and has plural N pieces of circular lens surfaces arranged concentrically around a common optical axis, and plural circular rise surfaces arranged adjacent alternately between these lens surfaces, and two lens surfaces adjacent via at least one of the rise surfaces are concave surfaces, and tangent lines and at the intersecting point with the rise surfaces of the shape of a cross section passing through the optical axis of those lens surfaces intersect at the outside with respect to the optical axis, and when the angle formed between these tangent lines is defined as $\theta$, a relational equation $\theta \geq \phi/(2\,n\,N)$ stands.

9 Claims, 9 Drawing Sheets

FRESNEL LENS AND LIGHTING APPARATUS PROVIDED WITH THE FRESNEL LENS

CROSS-REFERENCE TO RELATED APPLICATIONS

This application is based upon and claims the benefit of priority from prior Japanese Patent Application No. 2004-269226, filed Sep. 16, 2004, the entire contents of which are incorporated herein by reference.

BACKGROUND OF THE INVENTION

1. Field of the Invention

The present invention relates to a Fresnel lens and a lighting apparatus provided with the Fresnel lens, and more specifically to a lighting apparatus using a Fresnel lens for an illumination spotlight used on stages and studios and a Fresnel lens used therein.

2. Description of the Related Art

A lighting apparatus is used in the stage lighting and the studio lighting, which is generally suspended from the ceiling. In a possibility of its fall, it is desired that lighting apparatus is light in weight from the viewpoint of safety. Generally, lighting apparatus is provided with a light source of high brightness. Thus, the lighting apparatus is heated to a high temperature due to a heat radiation from the light source during a lighting operation. Therefore, it is desirable that the lens used in the lighting apparatus has a relatively thin body for dissipating heat. The Fresnel lens has characteristics that realize a thin body and lightweight. Accordingly, in the lighting apparatus in this field, it has been common that Fresnel lens is used as lens for projecting light rays.

Generally, a convex lens is formed into a relatively thick body having a spherical surface or an elliptic surface to provide a sufficient lens power, and the weight thereof becomes heavy. In contrast, the Fresnel lens has a concentric arrangement of Fresnel lens segments corresponding to a concentric arrangement of segment surfaces of the convex lens. Therefore, the Fresnel lens has stepped lens surfaces having refracting surfaces equivalent to that of the convex lens. In a design of the Fresnel lens, a convex lens is divided into concentric convex lens segments, the thick portions of the respective convex lens segments are reduced and the segment surfaces of the convex lens segments are arranged as the Fresnel lens segments, and the Fresnel lens segments are concentrically arranged in the same manner. Since the Fresnel lens is not so thick as compared with the convex lens, it enables to realize a thin lens having the same lens power as the convex lens. Thus, the Fresnel lens can be made into a relatively thin lens without becoming thick, accordingly the lightweight property of the lens is attained, and heat does not collect in the lens, and a relatively good heat radiation characteristic can be obtained. From these characteristics, Fresnel lens is used as light distribution control lens that enable both spotlighting and floodlighting, in lighting apparatus for a stage lighting application or a studio lighting application where light source of high light intensity and large heat generation is used.

In the lighting apparatus used for the stage lighting and the studio lighting, it is preferable that an illuminating beam to be projected on a floor has a smooth and uniform illumination distribution without unevenness in brightness in its projected range. However, in lighting apparatus using conventional Fresnel lens, unevenness in illuminating intensity cannot be restrained, and sufficient stage effects cannot be attained.

The uneven brightness in the illuminating beam in the Fresnel lens arises from rise surfaces of the Fresnel lens segments. In a Fresnel lens having such a shape as cut out from a convex lens, steps are formed between Fresnel lens segments, and inevitably have the rise surfaces. The rise surfaces cause light rays that are reflected or refracted to the outside of radiation area, and the rise surfaces partially block the illuminating beam, and dark lines that are darker than the circumferences thereof occur in the illuminating beam, causing unevenness in brightness.

A Fresnel lens provided with a lens structure improving the unevenness of the illuminating beam has been disclosed in, for example, Jpn. Pat. Appln. KOKAI Publication No. 8-306216. This Fresnel lens is formed as a substantially meniscus lens whose bottom surface is not a flat but a substantially circular. In this Fresnel lens, the angle of the rise surface of each Fresnel lens segment with respect to the optical axis becomes larger depending on a radial distance from the center of the lens, and the rise surfaces are inclined in a radial direction. In such a Fresnel lens, the light rays incident on the rise surface are reduced, and uneven brightness in the illumination is decreased. Further, in Jpn. Pat. Appln. KOKAI Publication No. 8-306216, a Fresnel lens is proposed that the pitch of steps is made small so as to reduce unevenness in brightness.

Although designs to reduce uneven brightness in illuminating beam have been made in the conventional Fresnel lenses, it is pointed out that the conventional designs fail to reduce unevenness sufficiently. The reason is that if the light rays projected from Fresnel lens segments adjacent each other illuminate areas adjacent each other on a floor surface, the illumination areas are partly overlapped each other so that there is produced a relatively intense illumination part on the areas.

In respect to the illumination distribution on the floor surface, the illumination distribution is composed of substantially rectangular distribution components which are produced due to beam components from the lens segments and the adjacent rectangular distribution components are overlapped each other so that the total illumination distribution has sharp peaks corresponding to the overlapped distribution components. Owing to these sharp peaks, the conventional Fresnel lens has a characteristic of uneven brightness in the illuminating beam.

Further, even if a Fresnel lens is so designed as to have segment lenses which provide no overlapping between the illumination distribution components, the lens surfaces of the segment lenses may be slightly displaced owing to a production error or the like, as a result, overlapping of the illumination distribution components occurs, leading to illumination unevenness.

As described above, in lighting apparatuses using the conventional Fresnel lens, there has not been proposed any effective method to solve the uneven illumination, accordingly, the improved Fresnel lens is expected.

BRIEF SUMMARY OF THE INVENTION

Accordingly, an object of the present invention is to provide a lighting apparatus that attains high stage effects to reduce uneven brightness in illuminating beam, and a Fresnel lens that realizes such a lighting apparatus.

According to one aspect of the present invention, there is provided a Fresnel lens having an optical axis comprising:

N pieces of Fresnel lens segments which are made of a lens material whose refraction index is n, and arranged concentrically around a common optical axis, configured to project light rays from a light source at a specified radiation view angle φ to an illumination area, and are made into ridge shapes respectively, wherein each Fresnel lens segment includes a lens surface which is curved into a concave surface toward the illumination area, and has a top area and a bottom area;

a rise surface which is arranged between adjacent lens surfaces, and joints with the top area and the bottom area, the top area and a bottom area defining first and second tangent lines contacting the top and bottom areas of the each lens surface in a cross section including the optical axis, respectively, and the angle between these first and second tangent lines being defined as θ, and an inequality of $\theta \geq \phi/(2 n N)$ being established.

According to one aspect of the present invention, there is also provided a lighting apparatus comprising:

a light source which emits light rays;

a Fresnel lens having an optical axis including:

N pieces of Fresnel lens segments which are made of a lens material whose refraction index is n, and arranged concentrically around a common optical axis, configured to project light rays from the light source at a specified radiation view angle φ to an illumination area, and are made into ridge shapes respectively, wherein each Fresnel lens segment includes a lens surface which is curved into a concave surface toward the illumination area, and has a top area and a bottom area;

a rise surface which is arranged between adjacent lens surfaces, and joints with the top area and the bottom area, the top area and a bottom area defining first and second tangent lines contacting the top and bottom areas of the each lens surface in a cross section including the optical axis, respectively, and the angle between these first and second tangent lines being defined as θ, and an inequality of $\theta \geq \phi/(2 n N)$ being established.

According to one aspect of the present invention, there is further provided a lighting apparatus comprising:

a light source which emits light rays;

a Fresnel lens which is made of a lens material whose refraction index is n, and projects light rays from the light source at a specified radiation view angle φ to an illumination area, and has an optical axis, the Fresnel lens comprising:

a plurality of Fresnel lens segments which are arranged concentrically around a common optical axis, and are made into ridge shapes respectively, wherein each Fresnel lens segment has a lens surface which is curved into a concave surface toward the illumination area, and has a top area and a bottom area, a rise surface which is arranged between adjacent lens surfaces, and joints with the top area and the bottom area, the light rays projected from adjacent lens surfaces irradiating circular band areas having widths, respectively, which mutually overlap at least half of the width of the circular band area.

DETAILED DESCRIPTION OF THE INVENTION

A Fresnel lens according to embodiments of the present invention and a lighting apparatus therewith are illustrated in more details by reference to the attached drawings hereinafter. In the description which follows, in principle the same numeral is allotted to the same component, and repeated explanations thereof are omitted.

Figure 1:
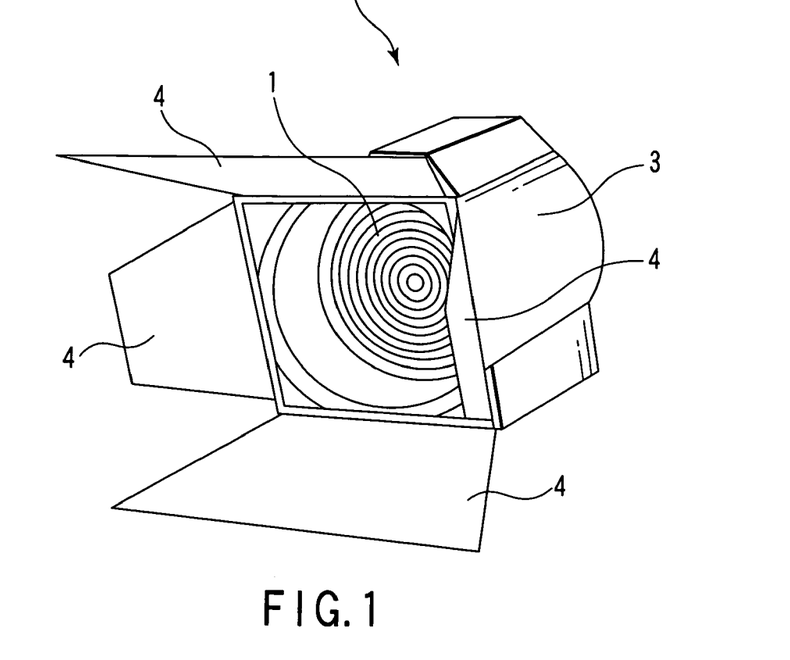
FIG. 1 is a perspective view schematically showing a lighting apparatus according to one embodiment of the present invention.
Figure 2:
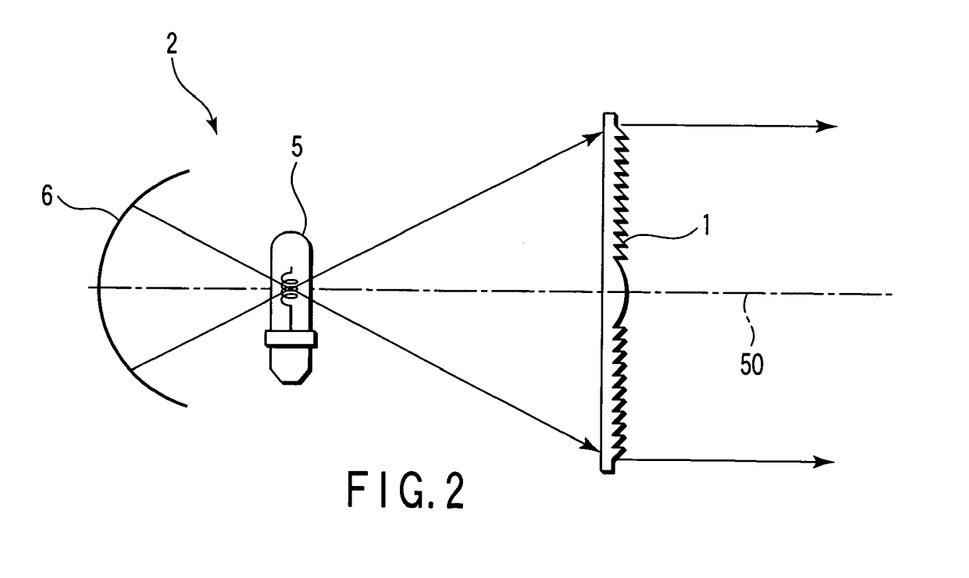
FIG. 2 is a schematic view showing an optical system for spotlighting, in the lighting apparatus shown in FIG. 1.
Figure 3:
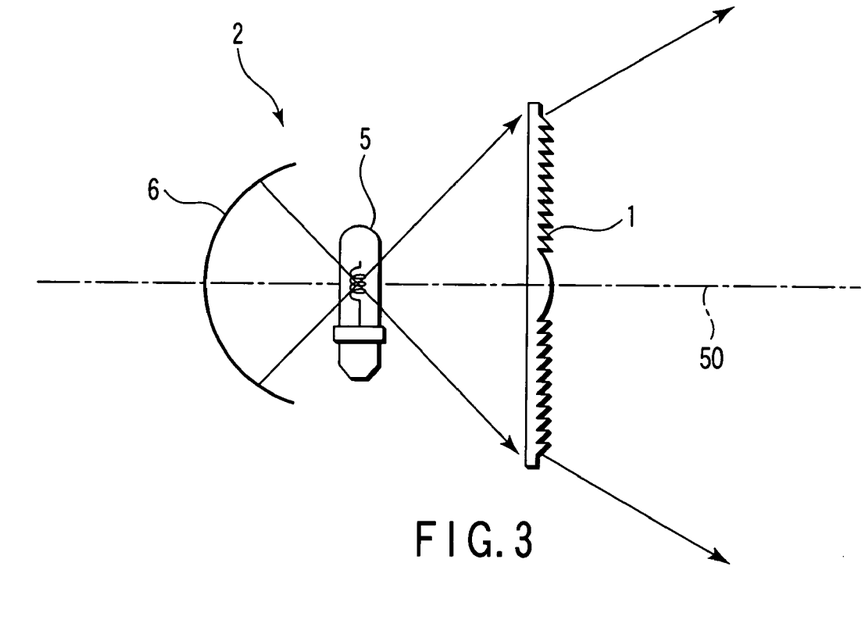
FIG. 3 is a schematic view showing an optical system for floodlighting, in the lighting apparatus shown in FIG. 1.

FIG. 1 is a perspective view schematically showing a lighting apparatus provided with a Fresnel lens according to one embodiment of the present invention. As shown in FIG. 1, a lighting apparatus 2 has a housing 3 and a Fresnel lens 1 arranged at the opening of the housing 3, and a light source 5 is arranged on the optical axis of the Fresnel lens 1 in the housing 3, as shown in FIGS. 2 and 3. Further, a convex mirror 6 is arranged as a light reflecting unit at rear side of the light source 5 in the housing 3 to reflect the beam from the light source 5 to the Fresnel lens 1. Further, a light controller, i.e., a louver 4 is provided at the front side of the housing 3 to block a part of the beam passing through the Fresnel lens 1 and shape the light beam.

The Fresnel lens 1 is made of a refracting material such as transparent resin or glass or the like. It is preferable to use heat resistance glass having a relatively large ratio of silicon dioxide and including boric acid ($B_2O_3$), sodium oxide or potassium oxide, aluminum oxide ($Al_2O_3$) and so forth. The housing 3 may be made of any material. However, it is preferable the housing is made of a metal material such as iron or aluminum and the like to have a characteristic of relatively good heat radiation and a sufficient strength.

The light source 5 and the light reflecting unit 6 shown in FIG. 2 are held and fixed to the housing 3. These components preferably can be moved along the optical axis and fixed at arbitrary positional relations so that the distances between the Fresnel lens 1 and the light source 5 or the light reflecting unit 6 can be set and the positional relations of these components can be adjusted, so that spotlighting as shown in FIG. 2 or such floodlighting as shown in FIG. 3 can be realized.

As shown in FIGS. 2 and 3, light rays from the light source 5 are directly projected to the Fresnel lens 1, and light rays reflected from the light reflecting unit 6 are also directed to the Fresnel lens 1. The light rays directed to the Fresnel lens 1 are refracted at the rear surface of the Fresnel lens 1 and pass through the Fresnel lens 1. The light rays are refracted again at the lens surfaces of respective segment lenses of the Fresnel lens 1 and directed to an illumination area 7. The light rays emerged from the Fresnel lens 1 are controlled and directed to respectively specified directions, so that the light rays are projected as a convergent beam or a divergent beam to the illumination area 7. In FIG. 2, the light rays from the respective lens surfaces of the Fresnel lens 1 are projected in substantially parallel with an optical axis 50 of the Fresnel lens 1 and the light rays are directed as spotlight beam to the illumination area 7. The spotlight beam illuminate a relatively narrow illumination area 7, and the lighting apparatus having a function of emitting the spotlight beam is so called as a spot light. In the optical system shown in FIG. 2, the light spot of the light source 5 is substantially arranged at the focal point of the reflecting unit 6, i.e., the concave mirror, and, the lighting point of the light source 5 is substantially arranged at the rear focal point of the Fresnel lens 1 and the light rays from the light source 5 and the reflecting unit 6 are projected as a substantially parallel beam from the Fresnel lens 1.

Figure 4:
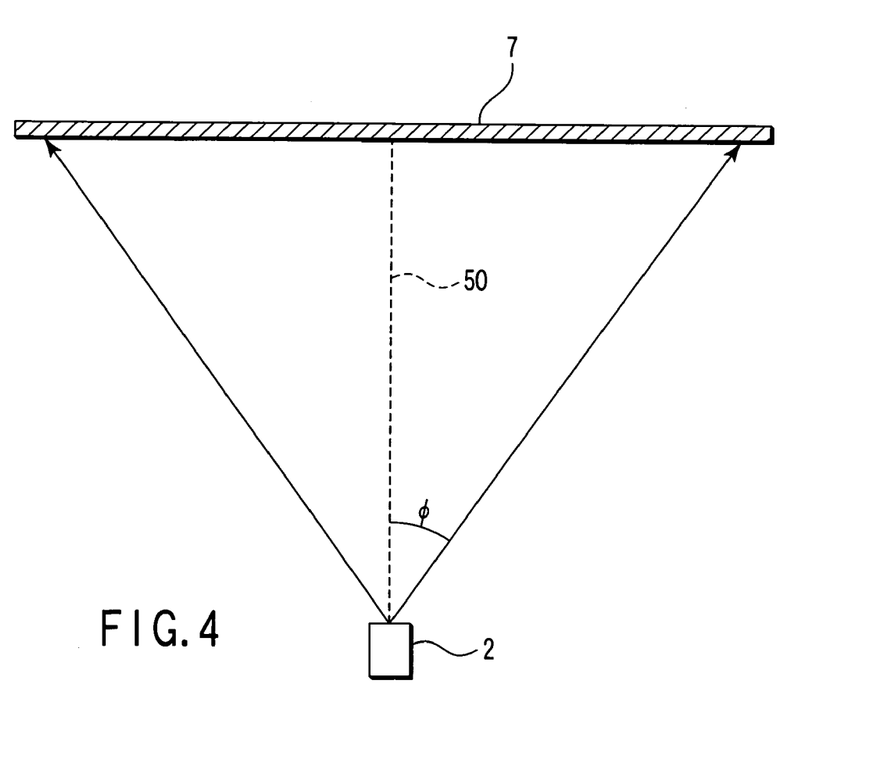
FIG. 4 is a schematic view showing a divergent illumination beam in the floodlighting shown in FIG. 3.

And, in the lighting apparatus 2, if the light source 5 and the light reflecting unit 6 are moved close to the Fresnel lens 1 as shown in FIG. 3, divergent light beam as shown in FIG. 4 is projected from the lighting apparatus 2. The divergent beam illuminates such a relatively wide illumination area 7 as shown in FIG. 4, and this lighting apparatus 2 functions as a floodlight that emits divergent beam, and illuminates the wide area 7 evenly. In the optical system shown in FIG. 3, the lighting point of the light source 5 is substantially arranged at the focal point of the reflecting unit 6 as the concave mirror, and, the lighting point of the light source 5 is substantially arranged between the rear focal point of the Fresnel lens 1 and the Fresnel lens 1, and the light rays from the light source 5 and from the reflecting unit 6 are projected as divergent beam from the Fresnel lens 1.

Figure 5:
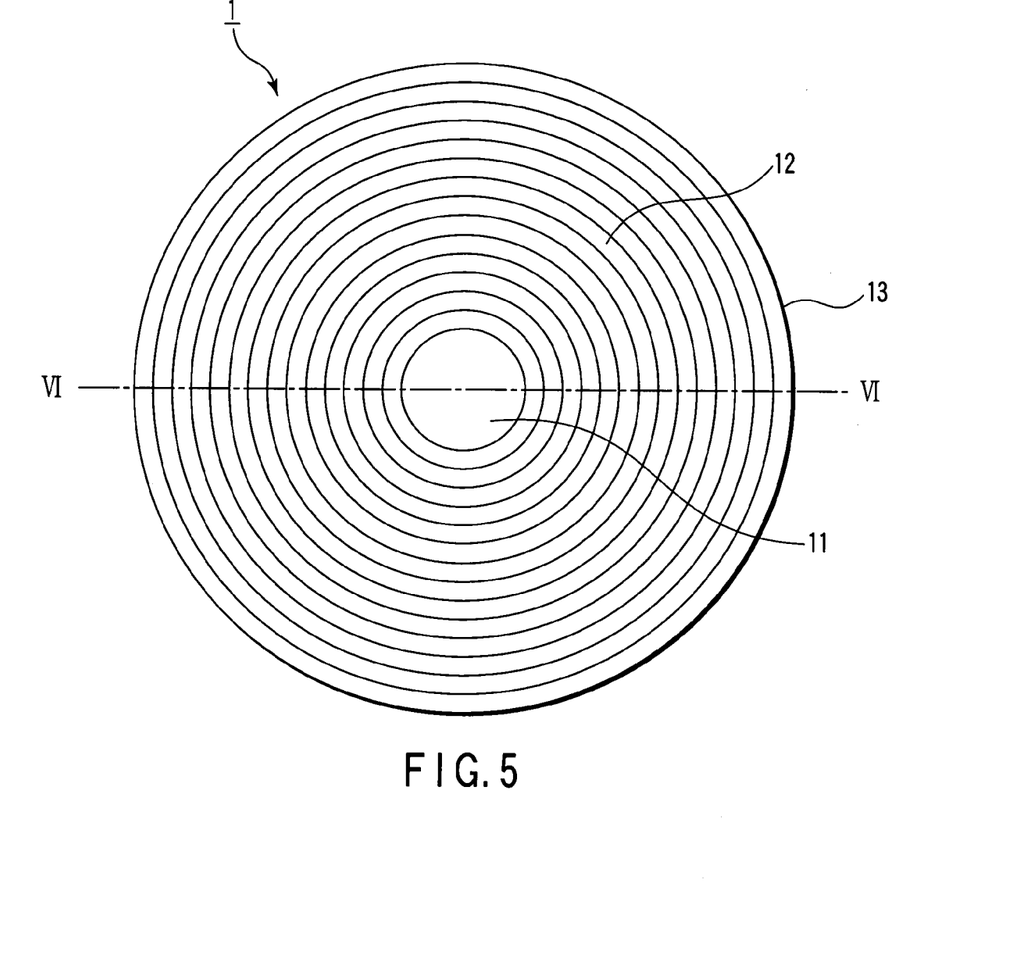
FIG. 5 is a front view showing a shape of the Fresnel lens shown in FIGS. 1 to 3.

The Fresnel lens shown in FIGS. 1 to 4 is formed into the shape shown in FIG. 5 as an example. In the Fresnel lens 1, when viewed from the front, its effective area that directs light rays to a specified direction is formed in a circular shape, which is composed of a convex lens portion 11 at a center area thereof and Fresnel lens segments 12 concentrically arranged around the center area. The Fresnel lens 1 has a flange portion 13 at the outermost circumference thereof, which is formed integrally with the Fresnel lens 1 for fixing and holding the Fresnel lens 1.

Figure 6:
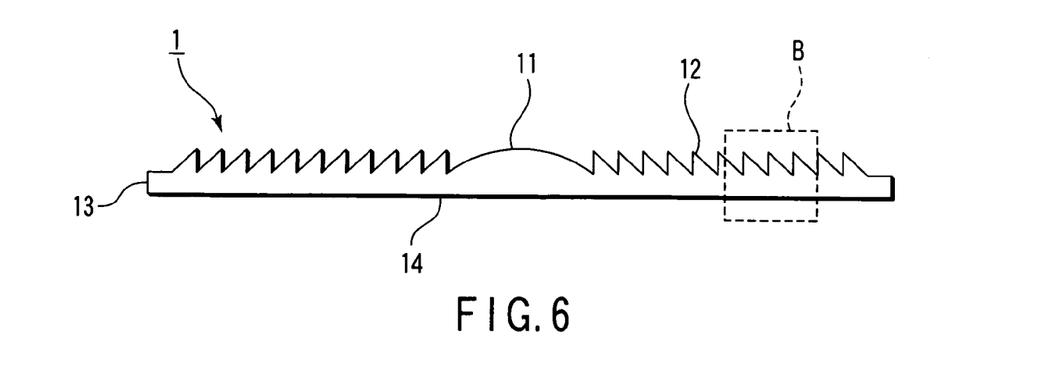
FIG. 6 is a cross sectional view taken along the line VI-VI of the Fresnel lens shown in FIG. 5.

FIG. 6 is a cross sectional view of the Fresnel lens 1 at the line VI-VI shown in FIG. 5, the line VI-VI passing through the optical axis of the Fresnel lens 1. As shown in FIG. 6, the Fresnel lens 1 has a substantially flat surface facing the light source 5 and Fresnel lens segments 12 faced to the illumination area 7. The Fresnel lens segments 12 are so concentrically arranged as to have a repeated arrangement of the ridges, and top and bottom of the ridge are alternately repeated in a sawtooth form on a the Fresnel lens segments 12. The diameter of the Fresnel lens 1, the diameter of the convex lens portion 11, and the width of the flange portion 13 may be determined arbitrarily according to the size and weight of a lighting device to be used, and the present invention is not limited by those values. However, in consideration of the light weight of the lighting apparatus and its easy manufacture, it is preferable that the diameter of the convex lens portion 11 is set to 10 mm to 60 mm, and the width of the flange portion 13 is set to 3 mm to 20 mm.

And, for the same reason, it is preferable that the pitch of the tops or the bottoms of the ridges of the Fresnel lens segments 12 is made 2 mm to 10 mm. And the pitch is not necessarily set uniform between the tops or the bottoms of the Fresnel lens segments 12, but it may be set variably between 2 mm and 10 mm. By the way, in the Fresnel lens 1 shown in FIG. 6, the surface of the light source side thereof is formed into a flat surface.

Figure 7:
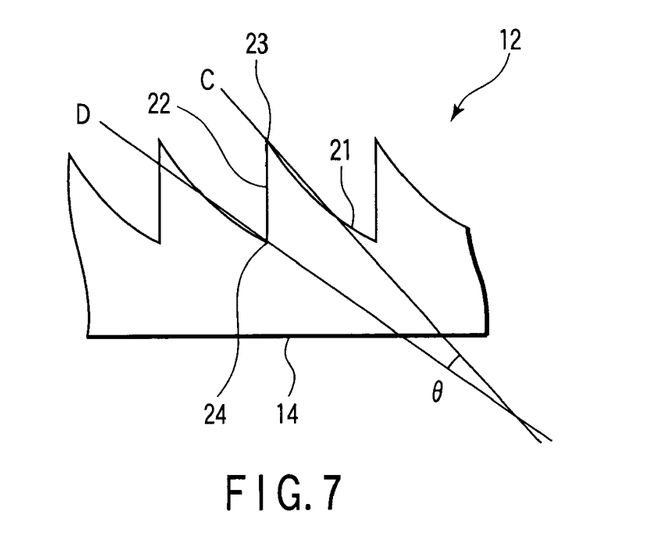
FIG. 7 is an enlarged cross sectional view of the part B shown in FIG. 6.

FIG. 7 is an enlarged cross sectional view of the part B shown in FIG. 6. In a cross section of the ridge of one Fresnel lens segment 12, the segment 12 is composed of a lens surface 21 which has a lens function, a rise surface 22 which corresponds to a step joining the lens surfaces of adjacent segments 12, and a tip or top 23 of the ridge and a bottom 24. The lens surface 21 is not formed on the convex surface to the outside corresponding to part of the surface of a flat or convex lens, but formed on the concave surface facing to the outside. The shape of the concave surface is formed in a smooth curve with no inflection point from the top 23 to the bottom 24.

The shape of this concave surface is defined by the tangent line C that contacts the area near the top 23 of the lens surface 21, and the tangent line D that contacts the area near the bottom 24 in the lens surface 21 adjacent via the rise surface 22. These tangent lines C and D are crossed at the position away from the optical axis and between the Fresnel lens 1 and the light source. As shown in FIG. 7, if the angle formed between the tangent line C and the tangent line D is defined as θ, then the following equation is established.

$$\theta \geq \phi/(2nN) \quad (1)$$

Figure 11:
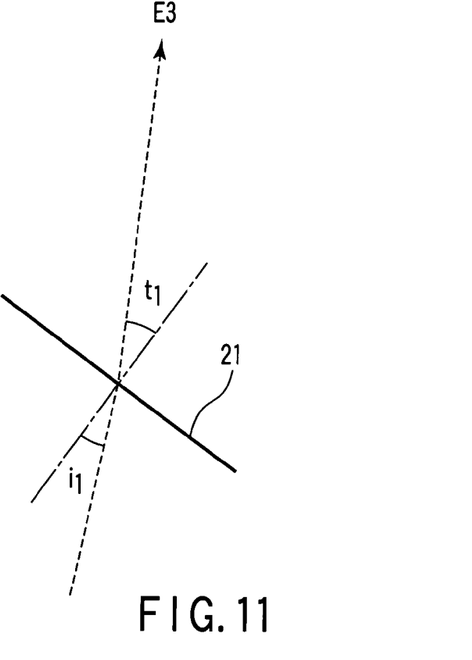
FIG. 11 is a schematic view showing a path of a light ray E3 shown in FIG. 10.

Herein, $\phi$ is the maximum lighting view angle of the lighting apparatus 2 shown in FIG. 4. n is the refraction index of the Fresnel lens 1, and N is the number of Fresnel lens segments 12 constituting the Fresnel lens 1, in other words, the total number of the lens surfaces 21. The total number N of the lens surfaces 21 is determined by the diameter of the Fresnel lens 1, the diameter of the convex lens portion 11 at the center, the pitch of the Fresnel lens segments 12, and the width of the flange portion 13.

If the equation (1) is established, bundles of light rays projected from adjacent lens surfaces 21 are mutually overlapped half or more at the illumination area 7, thereby, it is possible to restrain illumination unevenness.

Figure 8:
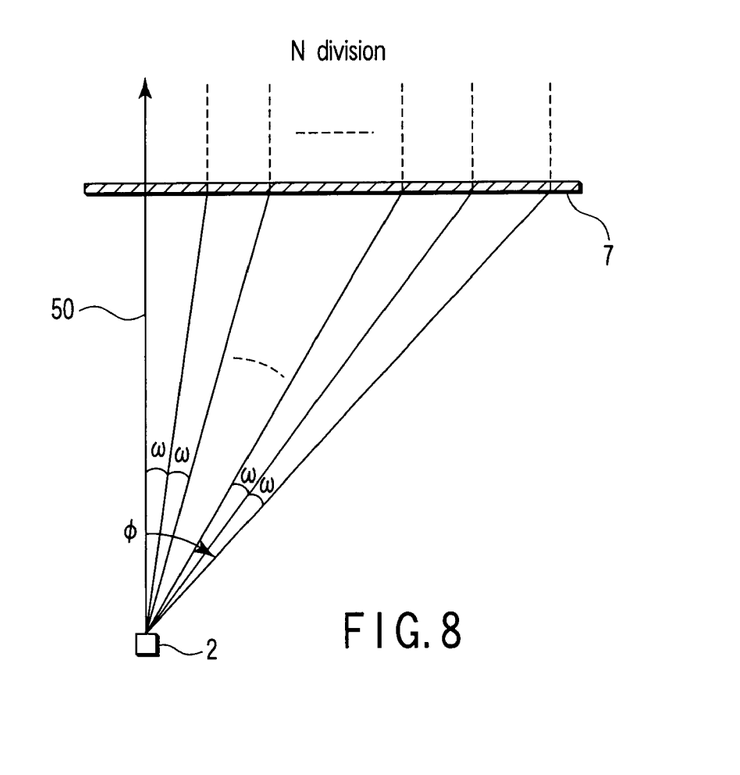
FIG. 8 is a schematic view showing a divergent illumination beam in the optical system shown in FIG. 2.

Herein, the process to arrive at the equation (1) is explained hereinafter. The Fresnel lens 1 generally used for lighting applications converts a beam or light rays projected from an emitting point of a light source as shown in FIG. 4 into a light beam of the lighting view angle $\phi(0°<\phi<90°)$ in the divergent direction and directs them to the illumination area 7. In such a lighting apparatus, as shown in FIG. 8, the divergence angle ω in the divergent direction of beam emerged from each Fresnel lens segment of the Fresnel lens 1, i.e., each lens surface becomes almost the same as the value obtained by dividing the lighting view angle $\phi$ by the number of lens surfaces N. Depending on the width of the lens surfaces, the divergence angle ω is not constant, but slightly variable, however it may be considered to be substantially constant. Accordingly, with regard to the divergence angle ω in the divergent direction of beam emerged from each lens surface, a relation expressed by the following equation is substantially established.

$$\omega = \phi/N \tag{2}$$

Figure 9:
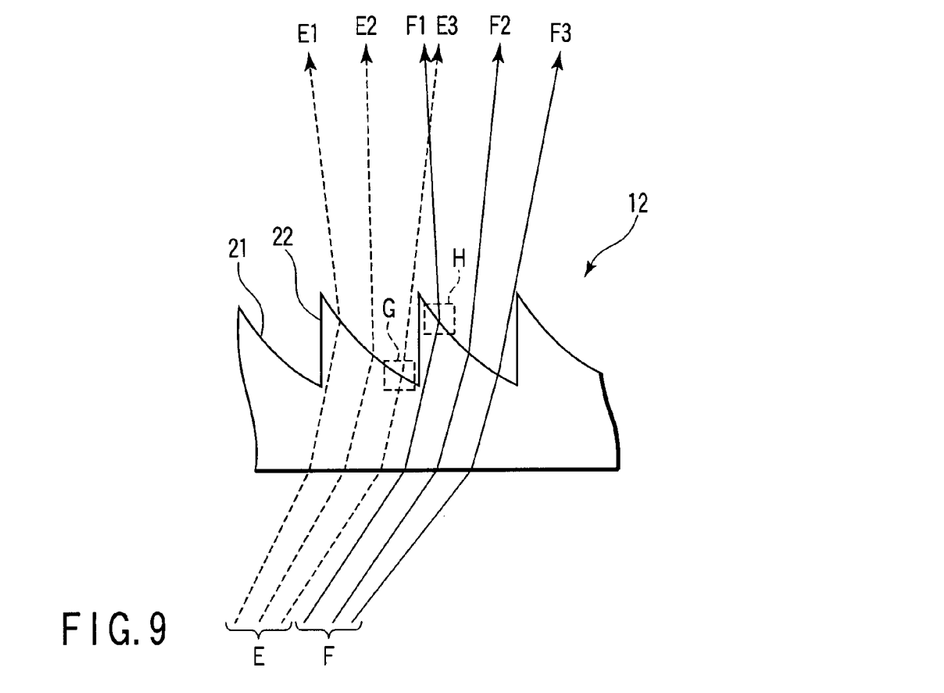
FIG. 9 is a schematic view showing optical paths of light rays passing through the Fresnel lens shown in FIG. 7.
Figure 10:
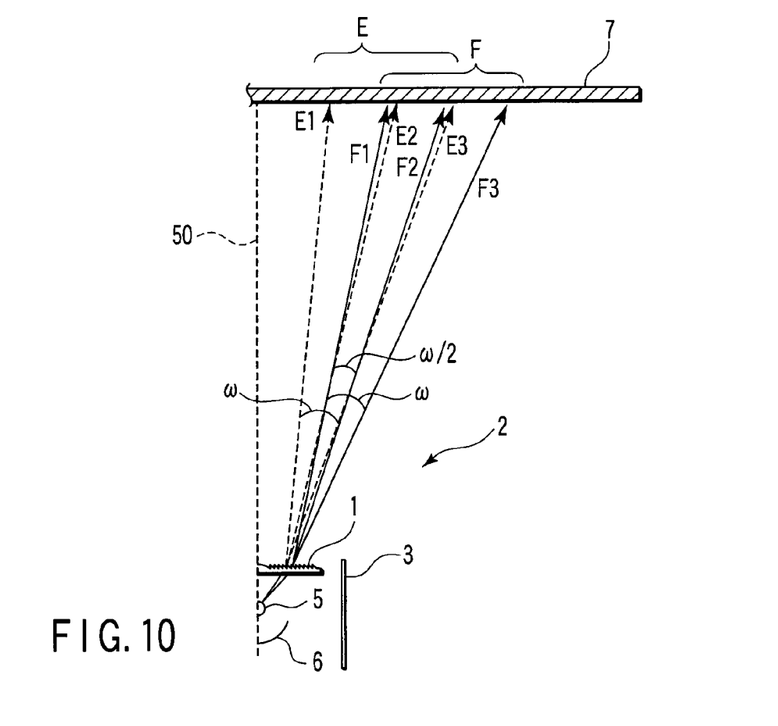
FIG. 10 is a schematic view showing an overlapping relationship of illuminating light rays in the divergent light beam shown in FIG. 8.
Figure 12:
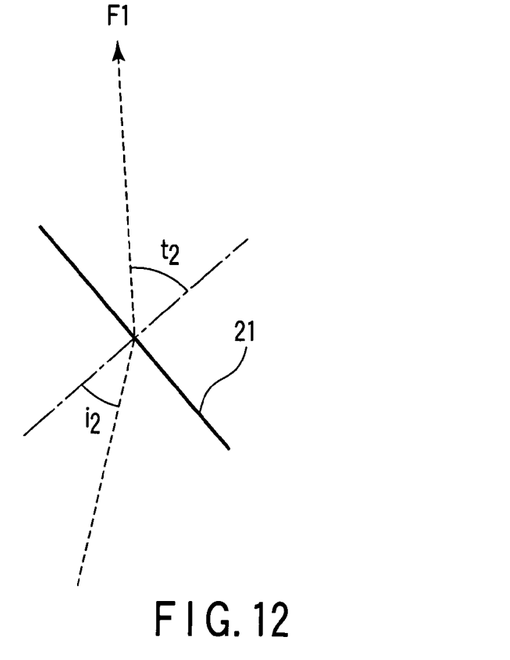
FIG. 12 is a schematic view showing a path of a light ray F1 shown in FIG. 10.

On the other hand, in the Fresnel lens 1 shown in FIGS. 5 and 6, the light rays emerged from each lens surface are radiated at the divergence angle ω in the radial direction. Herein, the lens surfaces of the Fresnel lens 1 are designed so that the light rays diverged from adjacent lens surfaces should overlap mutually in the range of half of mutual radiation ranges of adjacent lenses, i.e., in the angle range of ω/2. Herein, the situation that the light rays projecting from adjacent lens surfaces overlap with each other at the angle range of ω/2, in consideration of a beam group E and a beam group F projected from adjacent lens surfaces 21 as shown in FIGS. 9 and 10, means that the difference of the output angle $t_1$ of the beam E3 and the output angle $t_2$ of the beam F1 included in respective bundles of light rays becomes ω/2 as shown in FIGS. 11 and 12. Namely, the following equation stands.

$$t_2 - t_1 = \omega/2 \tag{3}$$

In the example shown in FIG. 9, bundles of light rays E1, E2, E3 . . . are projected from the lens surfaces arranged on the inner circumferential side along the radial direction of the Fresnel lens 1, and bundles of light rays F1, F2, F3 . . . are projected from the lens surfaces arranged on the outer circumferential side. In the lens surface that projects the bundles of light rays E1, E2, E3 . . . , the bundle of light rays E3 that is closest to the lens surface adjacent on the outer circumferential side passes through the point G near the bottom 24, and in the lens surface that projects the bundles of light rays F1, F2, F3 . . . , the bundle of light rays F1 that is closest to the lens surface adjacent on the inner circumferential side passes through the point H near the top. Since the point G near the bottom 24 and the point H near the top are adjacent to each other, the bundles of light rays E3 and the 24 portion F1 are incident into the point G near the bottom 24 and the point H near the top of the Fresnel lens 1 almost in parallel. The bundle of light rays E3 incident into the point G near the bottom 24 is refracted by a minute area of the lens surface corresponding to the point G near the bottom 24, and projected from this minute area. In the same manner, the bundle of light rays F1 incident into the point H near the top is refracted by a minute area of the lens surface corresponding to the point H near the top, and projected from this minute area. The difference θ between the angles of the tangent lines contacting both the minute areas explained with reference to FIG. 7 may be considered to be equal to the difference between the incident angles $i_1$ and $i_2$ of the respective beam E3 and F1 shown in FIGS. 11 and 12. Namely, the following equation stands.

$$\theta = i_1 - i_2 \tag{4}$$

Herein, FIG. 11 shows the trace of the bundle of light rays E3 in the point G near the bottom 24, and FIG. 12 shows the trace of the bundle of light rays F1 in the point H near the top. As shown in FIG. 11, the incident bundle of light rays E3 incident into the lens surface at the incident angle $i_1$ is refracted by the lens surface and projected at the output angle $t_1$. And, as shown in FIG. 12, the incident bundle of light rays F1 incident into the lens surface at the incident angle $i_2$ is refracted by the lens surface and projected at the output angle $t_2$. According to Snell's law as the beam reflection and refraction law, among the lens refraction index n, the incident angles $i_1$ and $i_2$, and the output angles $t_1$ and $t_2$, a relation expressed by the following equations stands.

$$n \sin i_1 = \sin t_1$$

$$n \sin i_2 = \sin t_2 \tag{5}$$

Herein, since θ is extremely small, by introducing an approximate equation sin θ÷θ, the above equations are approximately expressed as below.

$$n\, i_1 = t_1$$

$$n\, i_2 = t_2 \tag{6}$$

This approximate equation stands well with the angles of approximately 60 degrees or below as the general range for the incident angle and the output angle to the lens in the Fresnel lens.

By use of the above relation equations (2), (3), (4), and (6), a conditional equation to the angle θ formed by the tangent lines at the point near the top and the point near the bottom 24 that are adjacent to each other, for making the beam emerged from adjacent lens surfaces overlap mutually in the range of half of mutual radiation ranges, i.e., in the angle range of ω/2 is obtained as below.

$$\theta = \phi/(2\, n\, N) \tag{7}$$

Accordingly, if the condition of the equation (1) is satisfied, the bundles of light rays projected from mutually adjacent lens surfaces 21 are overlapped with half or more of each other on the radiated surface.

Next, examinations are further made on the Fresnel lens 1 as shown in FIGS. 5 and 6 where the convex lens portion 11 is arranged at the center, and the Fresnel lens segments 12 are concentrically around it. It is supposed that N pieces of Fresnel lens segments 12 of this Fresnel lens 1, i.e., N pieces of lens surfaces have a lighting view angle $\phi_f$ by themselves. In such a Fresnel lens, by the same introduction as the above equation (7), the following relational equation is obtained.

$$\theta = \phi_f/(2\, n\, N) \tag{8}$$

It may be considered that, to the lighting view angle φ of the entire Fresnel lens, the lighting view angle $\phi_0$ by only the center lens 11 is sufficiently small. Accordingly, the lighting view angle $\phi_f$ by only the N pieces of the Fresnel lens segments 12 may be considered to be substantially equal to the lighting view angle φ of the entire Fresnel lens. Namely, the following approximate equation stands, and in this case too, the equation (7) stands approximately.

$$\phi_f = \phi - \phi_0 = \phi \tag{9}$$

Accordingly, in this case too, if the condition of the equation (1) is satisfied, the bundles of light rays projected from mutually adjacent lens surfaces 21 are overlapped with half or more of each other on the radiated surface.

Figure 13:
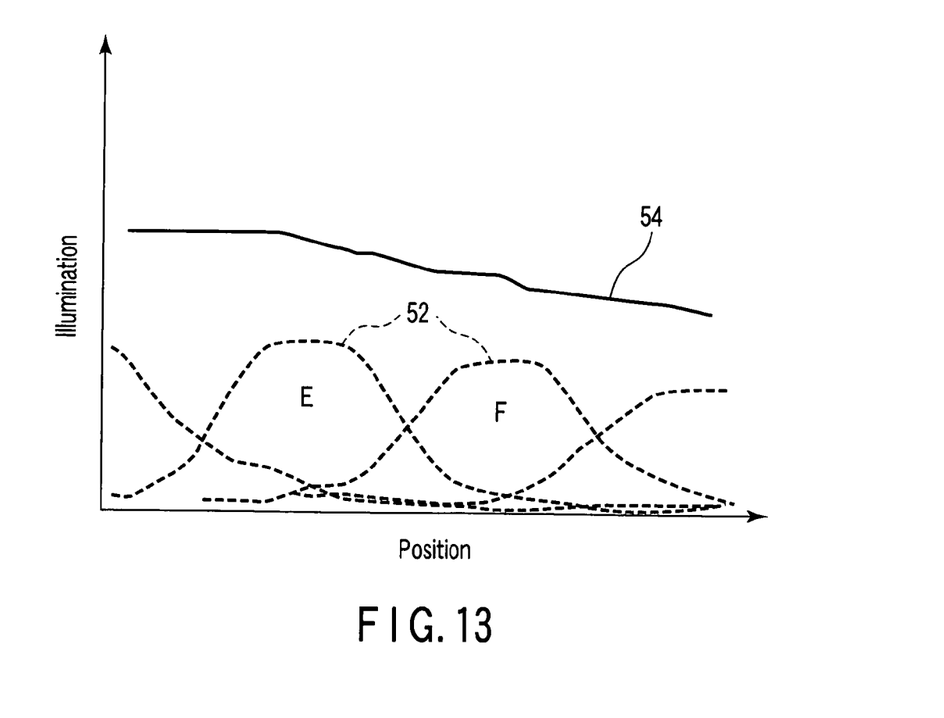
FIG. 13 is a graph showing a illumination distribution of an illuminating beam in the lighting apparatus shown in FIG. 1.

In the case where equity is true in the equation (1), namely, the Fresnel lens 1 of a structure in which the equation (7) stands is used, by beam projected from respective lens surfaces, the illumination area 7 is lighted by such an illumination distribution as shown in FIG. 13.

As shown in FIG. 13, the illumination distribution by the bundles of light rays E and F going out from the respective lens surfaces becomes nearly trapezoidal respectively as shown by dotted lines 52. And, the illumination distribution by the beam going out from the entire Fresnel lens 1 where these are overlapped becomes a smooth and even illumination distribution, as shown by a solid line 54 in FIG. 13.

Figure 14:
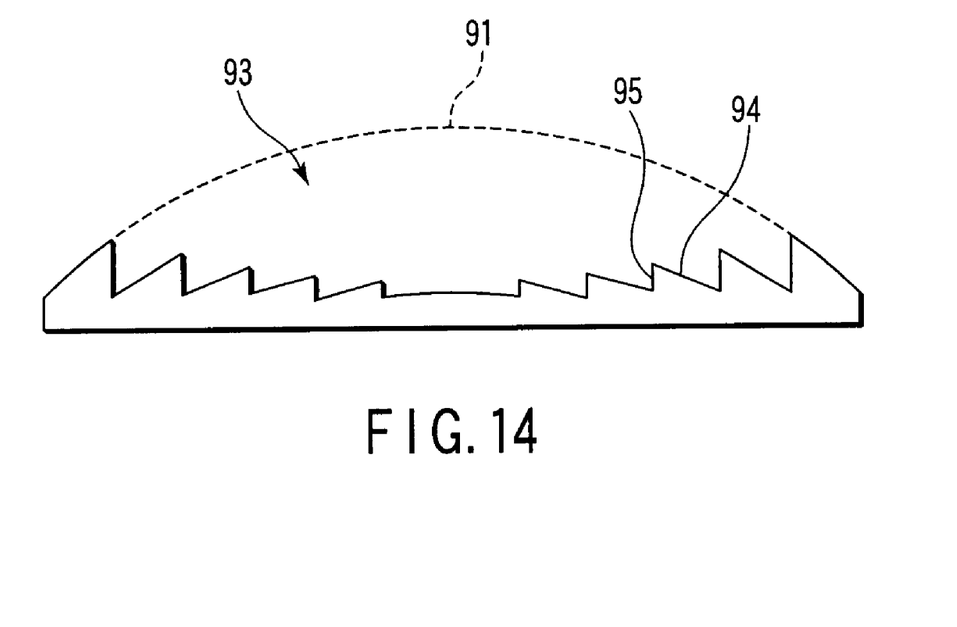
FIG. 14 is a schematic view showing a structure of a Fresnel lens according to a comparative example.

The illumination distribution of a Fresnel lens shown in FIG. 14 as a first comparative example is explained hereinafter. In this Fresnel lens 93 shown in FIG. 14, the lens surface of a convex lens 91 shown by a dotted line is divided into concentric lens segments, and the thick portions of the respective convex lens segments are reduced and replaced with Fresnel lens segments 94, and the Fresnel lens segments are concentrically arranged in the same manner. In such a Fresnel lens 93 as corresponding to a replacement of the convex lens 91, steps occur among Fresnel lens segments 94, and rise surfaces 95 always occur on the steps, and the rise surfaces 95 cause light beam that are reflected or refracted to the outside of illumination area, and the rise surfaces 95 block the illuminating beam, and dark lines that are darker than the circumferences thereof occur in the illuminating beam, causing unevenness in brightness, and there occur areas of low illumination level in the illumination distribution. In comparison with this, according to the Fresnel lens 1 shown in FIG. 6, as shown by the solid line 54 in FIG. 13, a smooth and even illumination distribution can be realized.

By the way, FIG. 13 shows the case where the beam or the bundles of light rays projected from mutually adjacent lens surfaces overlap with only half of each other on the radiated surface, if they overlap with half or more, namely, if the equation (1) stands, it is possible to form a sufficiently smooth illumination distribution. Further, even if there occurs a displacement in the illumination area of beam emerged from one lens surface owing to a production error or the like, the total illumination distribution does not change greatly, and it is possible to restrain unevenness in illumination.

Figure 15:
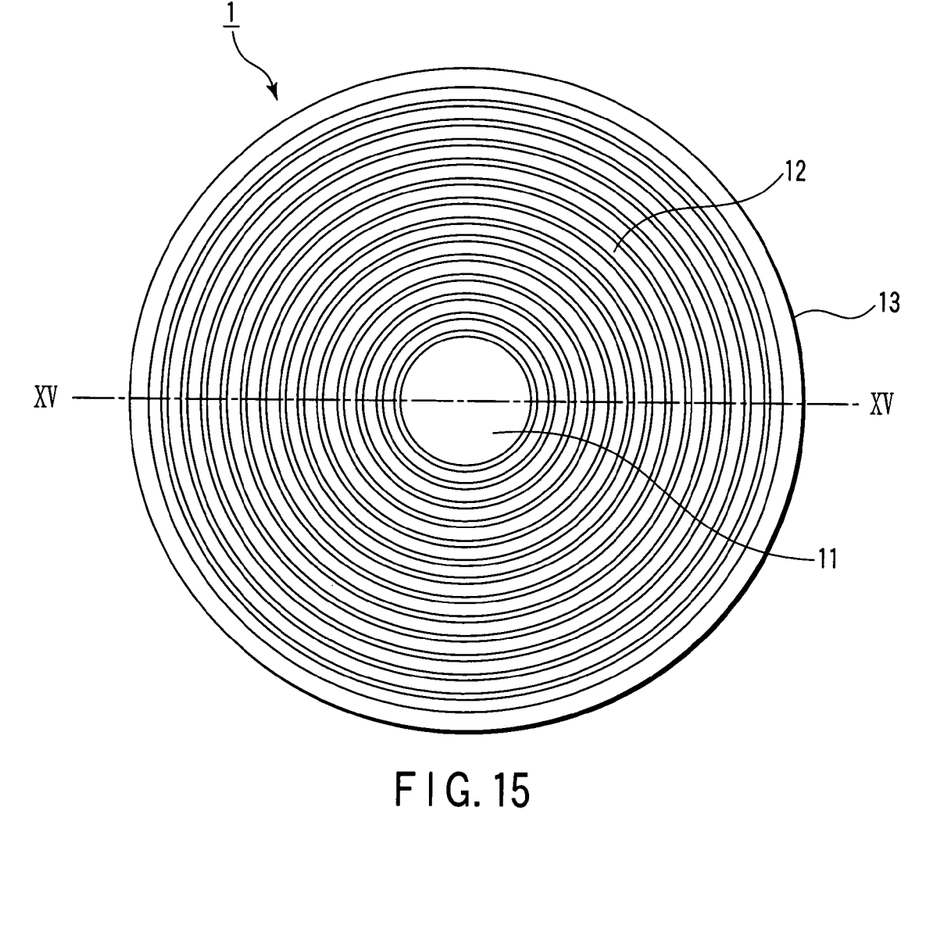
FIG. 15 is a front view schematically showing a Fresnel lens to be assembled in a lighting apparatus according to another embodiment of the present invention.

Next, another embodiment of the Fresnel lens 1 according to the present invention is explained with reference to FIGS. 15 to 17 hereinafter. FIG. 15 shows a front view of a Fresnel lens 1 according to another embodiment of the present invention. The Fresnel lens 1 shown in FIG. 15 is formed in a circular shape too, and is structured by a convex lens portion 11 at the center and Fresnel lens segments 12 formed concentrically around it. Further, the Fresnel lens 1 has a flange portion 13 that is formed for fixing and holding the lens at the outside of the Fresnel lens segment 12 at the outermost circumference.

Figure 16:
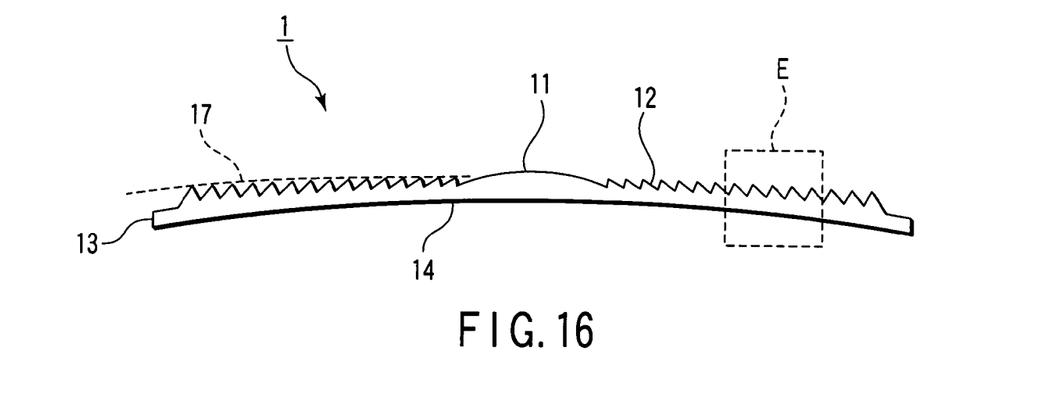
FIG. 16 is a cross sectional view of the Fresnel lens taken along the line XV-XV shown in FIG. 14.

FIG. 16 is a cross sectional view of the Fresnel lens 1 at the line XV-XV shown in FIG. 15. The Fresnel lens 1 has a circular arc bottom surface at the light source side, and the Fresnel lens segments 12 that configure the Fresnel lens 1 are respectively formed into ridge shapes. The Fresnel lens segments are arranged concentrically, and formed into a shape where tops and bottoms are alternately repeated in a sawtooth form as the entire shape of the Fresnel lens 1, and the tops and bottoms thereof contact a circular arc 17, and arranged along this circular arc. The entire Fresnel lens 1 is of a meniscus shape whose cross section is of a substantially circular arc shape.

The values of the diameter of the Fresnel lens 1, the diameter of the convex lens portion 11, and the width of the flange portion 13 may be determined arbitrarily according to the size and weight of a lighting device to be used, and the present invention is not limited by those values. However, in consideration of the light weight of the lighting apparatus and its easy manufacture, it is preferable that the diameter of the convex lens portion 11 is set to 10 mm to 60 mm, and the width of the flange portion 13 is set to 3 mm to 20 mm. And, for the same reason, it is preferable that the pitch of the tops and the bottom of the ridges that configure the Fresnel lens segments 12 is made 2 mm to 10 mm. And the pitch is not necessarily set uniform between the head and the gum included in the Fresnel lens segments 12, but it may be set variably between 2 mm and 10 mm.

Figure 17:
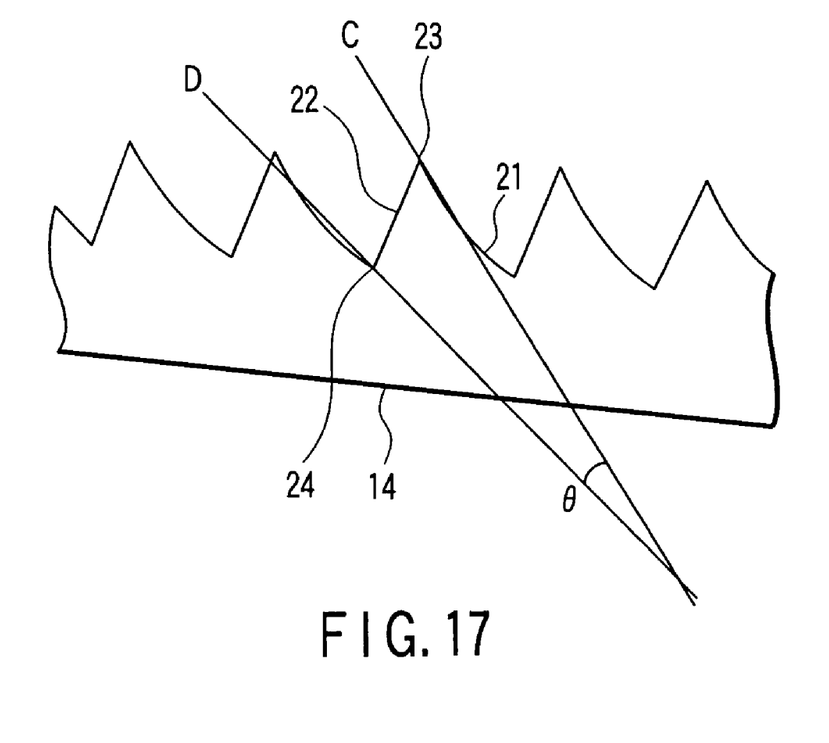
FIG. 17 is an enlarged cross sectional view of the part E shown in FIG. 15.

FIG. 17 is an enlarged cross sectional view of the part E shown in FIG. 16. As shown in FIG. 17, when attention is paid to the ridge of one Fresnel lens segment 12, the Fresnel lens segment 12 is structured by a lens surface 21 which has a lens function, a rise surface 22 which is a step between mutually adjacent lens surfaces, and a the top 23 of the head and a gum bottom 24. The lens surface 21 is formed into a concave shape to the outside in the same manner as the lens surface 21 shown in FIG. 7. The concave shape is formed in a smooth curve without an inflection point from the top 23 to the bottom 24.

The lens surface is defined by the tangent line C that contacts the area near the top 23 of the lens surface 21, and the tangent line D that contacts the area near the bottom 24 in the lens surface 21 adjacent via the rise surface 22, and these tangent lines C and D are crossed at the position away from the optical axis. At this moment, the angle θ formed between the tangent line C and the tangent line D satisfies the equation (1) in the same manner as in the above-mentioned embodiment.

According to such a Fresnel lens as the above, it is possible to make approximately half or more in the radial width of the area radiated by the bundles of light rays E and F projected from adjacent lens surfaces overlap.

Figure 18:
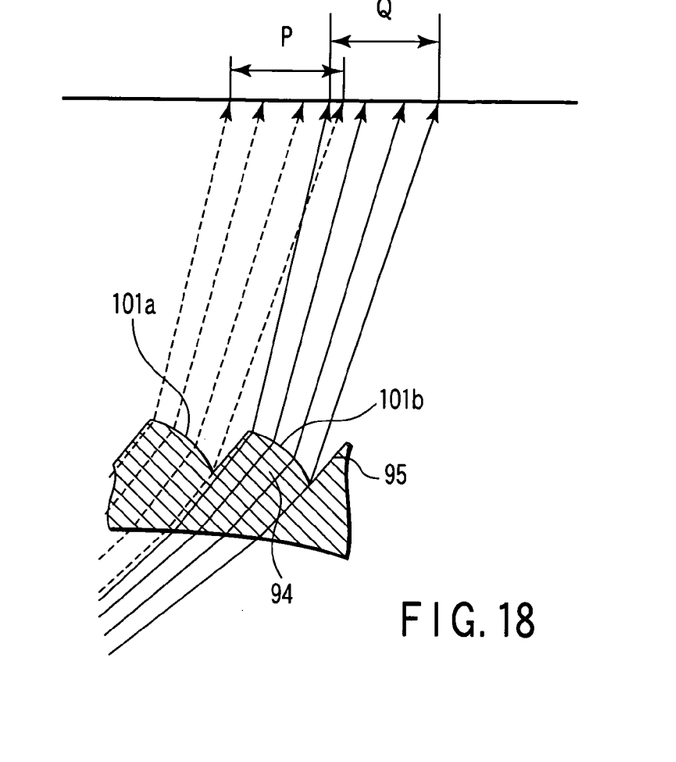
FIG. 18 is a schematic figure showing a structure of a Fresnel lens according to a second comparative example and paths of the light rays passing through the Fresnel lens.
Figure 19:
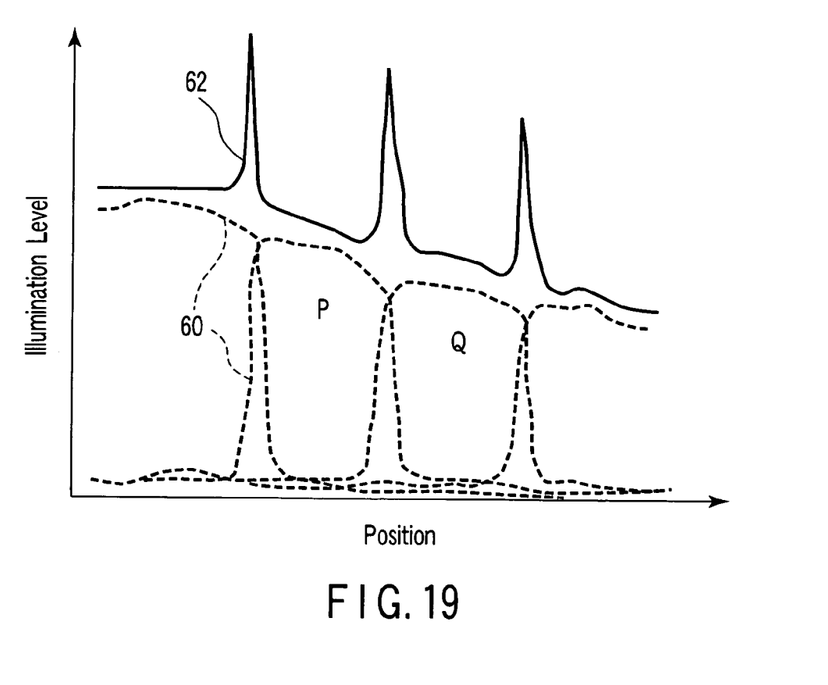
FIG. 19 is a graph showing an illumination distribution of an illuminating beam in a lighting apparatus to which the Fresnel lens according to the second comparative example shown in FIG. 18 is incorporated.

As a second comparative example, a Fresnel lens formed on a meniscus lens as shown in FIG. 18 is explained hereinafter. In the Fresnel lens shown in FIG. 18, toward the outer circumference of the lens from the center, the angle of a rise surface 95 of each Fresnel lens segment 100 to the optical axis becomes larger according to the substantially circular arc bottom shape and the rise surface 95 expands radially. In such a Fresnel lens, the amount of beam going into the rise surface 95 is reduced, uneven brightness in illuminating beam is decreased, however, there occur peaks based on overlapping of beam in the illumination distribution as shown in FIG. 19. Namely, the illumination distribution in areas P and Q formed by only beam going out from the lens surfaces 101a and 101b of each segment 94 becomes substantially rectangular distributions as shown by numeral 60 in FIG. 19, however, because there occur areas that overlap with each other, the illumination distribution by beam going out from the entire Fresnel lens as the total thereof becomes a distribution having sharp peaks 62 corresponding to the overlapped areas. Because of these sharp peaks 62, in the Fresnel lens shown in FIG. 18, unevenness in illuminating beam is generated. In comparison with this, according to the Fresnel lens 1 shown in FIG. 17, as shown by the solid line 54 in FIG. 13, a smooth even illumination distribution can be realized.

In the above embodiments, in order to further restrain uneven illumination, the rear surface 14 of the Fresnel lens or the rise surface 22 or both of them may be formed as a rough surface having a function of diffusing beam. As a concrete example to form the rough surface, there is a method for arranging a structure where extremely small dome shaped concaves and convexes of diameter 0.1 mm to 3 mm and height 0.1 mm to 3 mm are arranged at random or in a reticular pattern. Further, there is another method for arranging a structure of random concaves and convexes by chemical processing of the rear surface 14.

Further, in order to simplify the manufacture of the Fresnel lens 1, the cross sectional shape in the radial direction of the top 23 or the bottom 24 or both of them to form a Fresnel shape may be so formed as to be contained in a substantially circular arc shape. In order to restrain influences to illuminating beam, it is preferable to make the curvature radius of the arc 0.05 mm to 1 mm. By forming the top 23 into a substantially circular arc shape, it is possible to obtain a Fresnel lens where there hardly is breakage in the top 23 of the lens surface that may lead to uneven illuminating beam. Further, in the case where a Fresnel lens is manufactured by metallic mold formation, by making the top 23 and the bottom 24 into a substantially circular arc shape, molten glass easily gets into small void in the metallic mold. Thereby, it is possible to obtain a Fresnel lens of a complicated shape through easy manufacturing processes.

According to the present invention, respective lens surfaces of a Fresnel lens are structured so that the areas that adjacent lens surfaces radiates should overlap with half or more of each other. Thereby, it is possible to restrain uneven illumination owing to dark lines or bright lines on radiated surfaces.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lighting apparatus comprising:
   a light source which emits light rays;
   a Fresnel lens acting as a convex lens having a convergent function of converting the light rays to a spotlight and projecting the spotlight on an illumination area, which is made of a lens material whose refraction index is n, and projects light rays from the light source at a specified radiation view angle $\phi$ to the illumination area, and has an optical axis, the Fresnel lens comprising:
   a plurality of Fresnel lens segments which are arranged concentrically around a common optical axis, and are made into ridge shapes respectively, wherein
   each Fresnel lens segment includes:
   a segment lens surface which has a peak and a bottom corresponding to one and the other end of the segment lens surface, respectively, and is curved into a concave surface toward the illumination area in respect to a reference plane connecting the peak and the bottom, a rise surface which is arranged between adjacent lens surfaces, and extended between the peak and the bottom, the light rays projected from adjacent lens surfaces irradiating circular band areas having widths, respectively, which mutually overlap at least half of the width of the circular band area.

2. The lighting apparatus according to claim 1, wherein the Fresnel lens further comprises a convex lens portion on the optical axis.

3. The lighting apparatus according to claim 1, wherein the Fresnel lens comprises a flat surface opposing the segment lens surface and facing the light source.

4. The lighting apparatus according to claim 1, wherein the Fresnel lens has a form of a substantially meniscus lens, including a circular arc plane on which the tops of the plural Fresnel lens segments are arranged.

5. The lighting apparatus according to claim 1, wherein the rise surface diffuses the light rays.

6. The lighting apparatus according to claim 1, wherein the Fresnel lens has a rear surface facing the light source, which diffuses the light rays.

7. The lighting apparatus according to claim 6, wherein the rise surface diffuses light rays.

8. The lighting apparatus according to claim 1, wherein the peak and the bottom defines first and second tangent lines of the concave surface, the first and second lines passing through the peak and bottom lines of the each segment lens surface in a cross section including the optical axis, respectively, and the angle between the first and second tangent lines is defined as $\theta$, and an inequality of $\theta \geq \phi/(2nN)$ is established, wherein N is a number of Fresnel lens segments that have a refraction index n, and light rays project at an angle $\phi$ of an illumination area.

9. The lighting apparatus according to claim 1, further comprising:
   a convex mirror arranged at a rear side of the light source to reflect light rays to the Fresnel lens, wherein the light source has a light spot, the convex mirror has a focal point on the light spot, and the Fresnel lens has a rear focal point on the light spot.

* * * * *